US009589008B2

(12) United States Patent
Colgrove et al.

(10) Patent No.: US 9,589,008 B2
(45) Date of Patent: Mar. 7, 2017

(54) DEDUPLICATION OF VOLUME REGIONS

(71) Applicant: PURE Storage, INC., Mountain View, CA (US)

(72) Inventors: John Colgrove, Los Altos, CA (US); Ethan Miller, Santa Cruz, CA (US); John Hayes, Mountain View, CA (US); Cary Sandvig, Palo Alto, CA (US); Christopher Golden, Mountain View, CA (US); Jianting Cao, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 8 days.

(21) Appl. No.: 14/046,876

(22) Filed: Oct. 4, 2013

(65) Prior Publication Data

US 2014/0195749 A1    Jul. 10, 2014

Related U.S. Application Data

(60) Provisional application No. 61/751,142, filed on Jan. 10, 2013.

(51) Int. Cl.
  *G06F 3/00* (2006.01)
  *G06F 17/30* (2006.01)
  (Continued)

(52) U.S. Cl.
  CPC ........ *G06F 17/30345* (2013.01); *G06F 3/061* (2013.01); *G06F 3/065* (2013.01);
  (Continued)

(58) Field of Classification Search
  None
  See application file for complete search history.

(56) References Cited

U.S. PATENT DOCUMENTS

| | | |
|---|---|---|
| 5,208,813 A | 5/1993 | Stallmo |
| 5,940,838 A | 8/1999 | Schmuck et al. |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

International Search Report and Written Opinion in application No. PCT/US2014/010958, mailed Mar. 7, 2014, pp. 1-11.

(Continued)

*Primary Examiner* — Henry Tsai
*Assistant Examiner* — Christopher Bartels
(74) *Attorney, Agent, or Firm* — Edward J. Lenart; Kennedy Lenart Spraggins LLP

(57) ABSTRACT

A system and method for performing coarse-grained deduplication of volume regions. A storage controller detects that a first region of a first volume is identical to a second region of a second volume, wherein the first volume points to a first medium and the second volume points to a second medium. In response to detecting the identical regions, the storage controller stores an indication that the first range of the first medium underlies the second range of the second medium. Also in response to detecting the identical regions, the mappings associated with the second range of the second medium are invalidated.

20 Claims, 6 Drawing Sheets

(51) Int. Cl.
*G06F 3/06* (2006.01)
*G06F 12/08* (2016.01)
*G06F 12/12* (2016.01)

(52) U.S. Cl.
CPC ............ *G06F 3/0605* (2013.01); *G06F 3/067* (2013.01); *G06F 3/0608* (2013.01); *G06F 3/0611* (2013.01); *G06F 3/0614* (2013.01); *G06F 3/0619* (2013.01); *G06F 3/0626* (2013.01); *G06F 3/0641* (2013.01); *G06F 3/0652* (2013.01); *G06F 3/0655* (2013.01); *G06F 3/0664* (2013.01); *G06F 3/0665* (2013.01); *G06F 3/0667* (2013.01); *G06F 3/0671* (2013.01); *G06F 3/0683* (2013.01); *G06F 3/0685* (2013.01); *G06F 3/0689* (2013.01); *G06F 12/0891* (2013.01); *G06F 12/121* (2013.01); *G06F 17/30156* (2013.01)

(56) References Cited

U.S. PATENT DOCUMENTS

| | | | |
|---|---|---|---|
| 6,263,350 B1 | 7/2001 | Wollrath et al. | |
| 6,412,045 B1 | 6/2002 | DeKoning et al. | |
| 6,718,448 B1 | 4/2004 | Ofer | |
| 6,721,941 B1* | 4/2004 | Morshed | G06F 11/3612 709/217 |
| 6,757,769 B1 | 6/2004 | Ofer | |
| 6,799,283 B1 | 9/2004 | Tamai et al. | |
| 6,834,298 B1 | 12/2004 | Singer et al. | |
| 6,850,938 B1 | 2/2005 | Sadjadi | |
| 6,915,434 B1 | 7/2005 | Kuroda et al. | |
| 6,973,549 B1 | 12/2005 | Testardi | |
| 7,028,216 B2 | 4/2006 | Aizawa et al. | |
| 7,039,827 B2 | 5/2006 | Meyer et al. | |
| 7,100,089 B1* | 8/2006 | Phelps | G06F 3/0607 711/162 |
| 7,216,164 B1 | 5/2007 | Whitmore et al. | |
| 7,783,682 B1* | 8/2010 | Patterson | G06F 12/0253 707/609 |
| 7,873,619 B1 | 1/2011 | Faibish et al. | |
| 7,913,300 B1 | 3/2011 | Flank et al. | |
| 8,352,540 B2 | 1/2013 | Anglin et al. | |
| 8,560,747 B1 | 10/2013 | Tan et al. | |
| 8,700,875 B1 | 4/2014 | Barron et al. | |
| 9,423,967 B2 | 8/2016 | Colgrove et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 9,513,820 B1 | 12/2016 | Shalev | |
| 9,516,016 B2 | 12/2016 | Colgrove et al. | |
| 2002/0038436 A1 | 3/2002 | Suzuki | |
| 2002/0087544 A1 | 7/2002 | Selkirk et al. | |
| 2002/0147862 A1 | 10/2002 | Traut et al. | |
| 2004/0049572 A1 | 3/2004 | Yamamoto et al. | |
| 2006/0074940 A1 | 4/2006 | Craft et al. | |
| 2006/0155946 A1 | 7/2006 | Ji | |
| 2007/0067585 A1 | 3/2007 | Ueda et al. | |
| 2007/0171562 A1 | 7/2007 | Maejima et al. | |
| 2007/0192863 A1* | 8/2007 | Kapoor | G06F 9/505 726/23 |
| 2007/0220313 A1 | 9/2007 | Katsuragi et al. | |
| 2007/0266179 A1* | 11/2007 | Chavan | G06F 13/4022 709/250 |
| 2008/0059699 A1 | 3/2008 | Kubo et al. | |
| 2008/0065852 A1 | 3/2008 | Moore et al. | |
| 2008/0134174 A1* | 6/2008 | Sheu | G06F 12/1036 718/1 |
| 2008/0155191 A1 | 6/2008 | Anderson et al. | |
| 2008/0178040 A1 | 7/2008 | Kobayashi | |
| 2008/0209096 A1 | 8/2008 | Lin et al. | |
| 2008/0216073 A1* | 9/2008 | Yates | G06F 9/30174 718/100 |
| 2008/0229415 A1* | 9/2008 | Kapoor | G06F 21/55 726/22 |
| 2008/0244205 A1 | 10/2008 | Amano et al. | |
| 2008/0275928 A1 | 11/2008 | Shuster | |
| 2008/0285083 A1 | 11/2008 | Aonuma | |
| 2009/0006587 A1 | 1/2009 | Richter | |
| 2009/0037662 A1 | 2/2009 | La Frese et al. | |
| 2009/0204858 A1 | 8/2009 | Kawaba | |
| 2009/0228648 A1 | 9/2009 | Wack | |
| 2010/0058026 A1* | 3/2010 | Heil | G06F 12/1027 711/207 |
| 2010/0067706 A1 | 3/2010 | Anan et al. | |
| 2010/0153620 A1 | 6/2010 | McKean et al. | |
| 2010/0191897 A1 | 7/2010 | Zhang et al. | |
| 2010/0250882 A1 | 9/2010 | Hutchison et al. | |
| 2010/0281225 A1 | 11/2010 | Chen et al. | |
| 2011/0145598 A1* | 6/2011 | Smith | G06F 21/554 713/190 |
| 2011/0167221 A1 | 7/2011 | Pangal et al. | |
| 2011/0238634 A1 | 9/2011 | Kobara | |
| 2011/0307456 A1 | 12/2011 | Jayaraman et al. | |
| 2011/0307663 A1* | 12/2011 | Kultursay | G06F 17/5045 711/125 |
| 2012/0023375 A1 | 1/2012 | Dutta et al. | |
| 2012/0198175 A1 | 8/2012 | Atkisson | |
| 2012/0317079 A1* | 12/2012 | Shoens | G06F 17/30215 707/639 |
| 2012/0330904 A1 | 12/2012 | Factor et al. | |
| 2012/0330954 A1* | 12/2012 | Sivasubramanian | G06F 9/5061 707/737 |
| 2013/0042052 A1 | 2/2013 | Colgrove et al. | |
| 2013/0046995 A1 | 2/2013 | Movshovitz | |
| 2013/0047029 A1 | 2/2013 | Ikeuchi et al. | |
| 2013/0091102 A1 | 4/2013 | Nayak | |
| 2013/0124798 A1* | 5/2013 | Aszmann | G06F 3/0689 711/114 |
| 2013/0205110 A1 | 8/2013 | Kettner | |
| 2013/0275391 A1* | 10/2013 | Batwara | G06F 17/30085 707/689 |
| 2013/0318314 A1 | 11/2013 | Markus et al. | |
| 2013/0339303 A1 | 12/2013 | Potter et al. | |
| 2014/0089730 A1 | 3/2014 | Watanabe et al. | |
| 2014/0101361 A1* | 4/2014 | Gschwind | G06F 12/0292 711/6 |
| 2014/0172929 A1 | 6/2014 | Sedayao et al. | |
| 2014/0229131 A1 | 8/2014 | Cohen et al. | |
| 2014/0281308 A1 | 9/2014 | Lango et al. | |
| 2014/0281361 A1* | 9/2014 | Park et al. | 711/206 |
| 2014/0325115 A1* | 10/2014 | Ramsundar | G06F 12/0238 711/102 |
| 2015/0234709 A1 | 8/2015 | Koarashi | |
| 2015/0244775 A1 | 8/2015 | Vibhor et al. | |
| 2015/0278534 A1 | 10/2015 | Thiyagarajan et al. | |
| 2016/0019114 A1 | 1/2016 | Han et al. | |

FOREIGN PATENT DOCUMENTS

| | | |
|---|---|---|
| EP | 3066610 A1 | 9/2016 |
| EP | 3082047 A1 | 10/2016 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-99/13403 A1 | 3/1999 |
| WO | WO-2008/102347 A1 | 8/2008 |
| WO | WO-2010/071655 A1 | 6/2010 |

OTHER PUBLICATIONS

Microsoft Corporation, "GCSettings.IsServerGC Property", Retrieved Oct. 27, 2013 via the WayBack Machine, 3 pages.
Microsoft Corporation, "Fundamentals of Garbage Collection", Retrieved Aug. 30, 2013 via the WayBack Machine, 11 pages.

* cited by examiner

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-999 | RU | 5 | 0 | 2 | N |
| 8 | 0-499 | R | 8 | 500 | 1 | N |
| 10 | 0-999 | QU | 10 | 0 | 1 | Y |
| 14 | 0-999 | RU | 14 | 0 | 10 | Y |
| 18 | 0-999 | RU | 18 | 0 | 14 | N |
| 25 | 0-999 | RU | 25 | 0 | 14 | Y |
| 33 | 0-999 | RU | 33 | 0 | 25 | N |
| 35 | 0-299 | RU | 35 | 400 | 18 | N |
| 35 | 300-499 | RU | 35 | -300 | 33 | Y |
| 35 | 500-899 | RU | 35 | -400 | 5 | N |

Q – Quiescent; R – Registered; U – Unmask

FIG. 3

DEDUPLICATION OF VOLUME REGIONS

CROSS-REFERENCE TO RELATED APPLICATIONS

This application claims the benefit of U.S. Provisional Application No. 61/751,142, filed Jan. 10, 2013, the entirety of which is incorporated herein by reference.

BACKGROUND OF THE INVENTION

Field of the Invention

This invention relates to performing deduplication of volume regions in a storage system.

Description of the Related Art

As computer memory storage and data bandwidth increase, so does the amount and complexity of data that businesses daily manage. Large-scale distributed storage systems, such as data centers, typically run many business operations. A datacenter, which may also be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

Software applications, such as a logical volume manager or a disk array manager, provide a means of allocating space on mass-storage arrays. In addition, this software allows a system administrator to create units of storage groups including logical volumes. Storage virtualization provides an abstraction of logical storage from physical storage in order to access logical storage without end-users identifying physical storage.

To support storage virtualization, a volume manager performs input/output (I/O) redirection by translating incoming I/O requests using logical addresses from end-users into new requests using addresses associated with physical locations in the storage devices. As some storage devices may include additional address translation mechanisms, such as address translation layers which may be used in solid state storage devices, the translation from a logical address to another address mentioned above may not represent the only or final address translation.

For many storage systems, large regions of separate logical volumes often include the same data, or are reused among multiple volumes. For example, a system may include large numbers of virtual machines generated from the same gold master in which the preloaded system software occupies the first gigabyte (GB) of the volume. This system software may be the same for multiple volumes, resulting in the duplication of large regions of data in multiple volumes. Efforts to reduce the amount of identical data stored in the storage system are needed to improve the efficiency and operational capacity of the storage system.

In view of the above, systems and methods for performing deduplication of volume regions are desired.

SUMMARY OF THE INVENTION

Various embodiments of systems and methods for performing coarse-grained deduplication of volume regions are contemplated.

A storage system may include a storage controller and one or more storage devices. The storage system may be coupled to one or more host client systems. In one embodiment, the storage controller may utilize volumes and mediums to track client data that is stored in the storage system. A medium is defined as a logical grouping of data, and each medium has an identifier with which to identify the logical grouping of data.

The storage controller may maintain a volume to medium mapping table to map each volume to a single medium, and this medium is referred to as the volume's anchor medium. Each medium may be mapped to any number of other mediums, and the storage controller may also maintain a medium mapping table to track relationships between anchor mediums and underlying mediums, with each underlying medium representing a snapshot. The storage controller may also maintain an address translation table. The address translation table may include mappings of mediums and block numbers to physical storage locations.

In one embodiment, the storage controller may be configured to perform coarse-grained deduplication of large regions of two volumes that are identical. This coarse-grained deduplication may be performed after the volumes have been created and mapped to their underlying mediums. When the storage controller discovers that a first and second medium have the same content for a range of blocks, the storage controller may merge all of the mappings into the first medium and then map the range of the second medium into the first medium.

In one embodiment, coarse-grained deduplication of volume regions may be performed after fine-grained deduplication has been performed on the underlying data. Large numbers of fine-grained mapping table entries may have already been created for a second volume region which is identical to a first volume region. In response to detecting that the first and second volume regions are identical, a new entry may be created in the medium mapping table to record that the first volume region underlies the second volume region. This new entry may replace a plurality of fine-grained mapping table entries corresponding to the second volume region, reducing the amount of metadata stored in the storage system.

These and other embodiments will become apparent upon consideration of the following description and accompanying drawings.

BRIEF DESCRIPTION OF THE DRAWINGS

FIG. 3 illustrates one embodiment of a medium mapping table.

Figure 1:
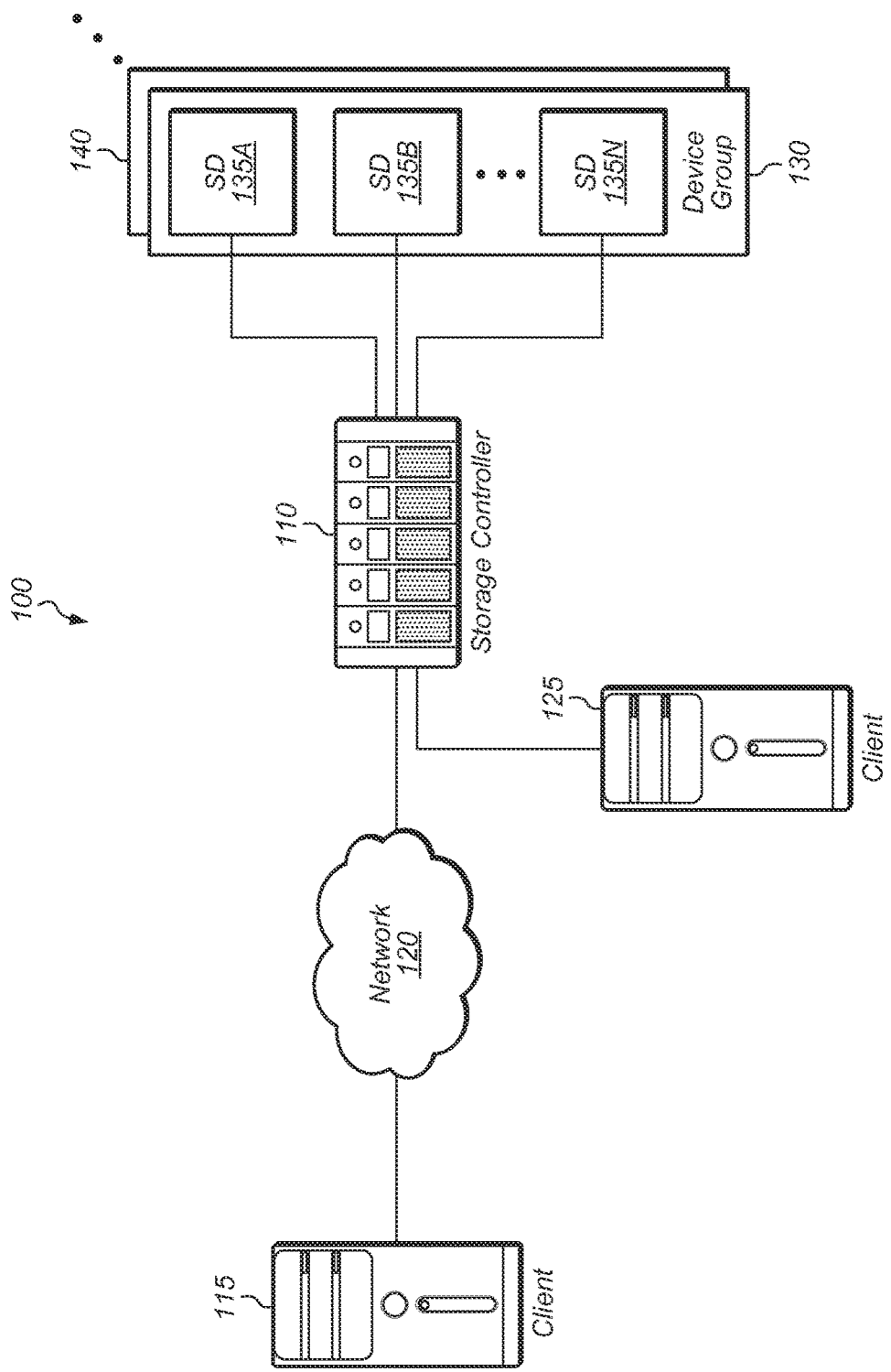
FIG. 1 is a generalized block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring now to FIG. 1, a generalized block diagram of one embodiment of a storage system 100 is shown. Storage system 100 may include storage controller 110 and storage device groups 130 and 140, which are representative of any number of storage device groups (or data storage arrays). As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various fine-grained deduplication techniques for reducing the amount of data stored in devices 135A-N by deduplicating common data segments.

Storage controller 110 may also be configured to create and manage snapshots in system 100. Accordingly, a set of mediums may be recorded and maintained by storage controller 110. Most of the mediums may be read-only except for one or more selected mediums such as the most recent medium in use by a particular volume. A read-only medium may represent a previously taken snapshot. Each medium logically comprises all of the blocks in the medium. However, only the blocks that were changed from the time the medium was created to the time the medium was closed are saved and mappings to these blocks may also be maintained with the medium.

In various embodiments, multiple mapping tables may be maintained by storage controller 110. These mapping tables may include a medium mapping table, a volume-to-medium mapping table, an address translation table, a deduplication table, an overlay table, and/or other tables. In some embodiments, the information stored in two or more of these tables may be combined into a single table. The medium mapping table may be utilized to record and maintain the mappings between mediums and underlying mediums and the volume-to-medium mapping table may be utilized to record and maintain the mappings between volumes and mediums.

The address translation table may include a plurality of entries, with each entry holding a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium during a lookup operation corresponding to a received read/write request. This physical pointer value may then be used to locate a physical location within the storage devices 135A-N. It is noted that the physical pointer value may be used to access another mapping table within a given storage device of the storage devices 135A-N. Consequently, one or more levels of indirection may exist between the physical pointer value and a target storage location.

In various embodiments, the address translation table may be accessed using a key comprising a medium ID, a logical or virtual address, a sector number, and so forth. A received read/write storage access request may identify a particular volume, sector, and length. The volume ID may be mapped to a medium ID using the volume to medium mapping table. A sector may be a logical block of data stored in a medium. Sectors may have different sizes on different mediums. The address translation table may map a medium in sector-size units. In one embodiment, the key value for accessing the address translation table may be the combination of the medium ID and the received sector number. A key is an entity in a mapping table that distinguishes one row of data from another row. In other embodiments, other types of address translation tables may be utilized.

In one embodiment, the address translation table may map mediums and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connection, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

Figure 2:
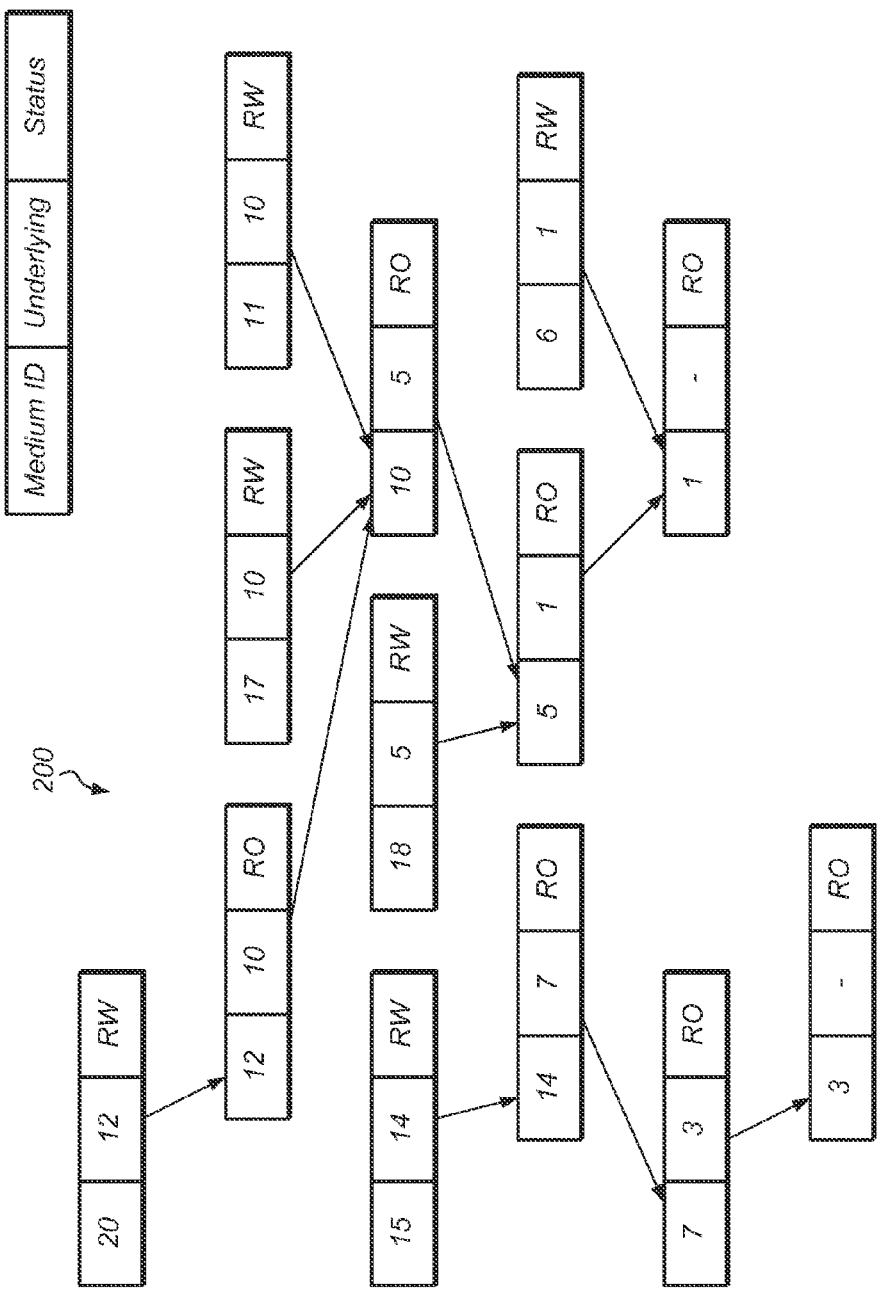
FIG. 2 is a generalized block diagram of one embodiment of a directed acyclic graph (DAG) of mediums.

Referring now to FIG. 2, a block diagram illustrating a directed acyclic graph (DAG) 200 of mediums is shown. Also shown is a volume to medium mapping table 205 which shows which medium a volume maps to for each volume in use by a storage system. Volumes may be considered pointers into graph 200.

The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

The term medium is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

It is also noted that the term "volume to medium mapping table" may refer to multiple tables rather than just a single table. Similarly, the term "medium mapping table" may also refer to multiple tables rather than just a single table. It is further noted that volume to medium mapping table 205 is only one example of a volume to medium mapping table. Other volume to medium mapping tables may have other numbers of entries for other numbers of volumes.

Each medium is depicted in graph 200 as three conjoined boxes, with the leftmost box showing the medium ID, the middle box showing the underlying medium, and the rightmost box displaying the status of the medium (RO—read-only) or (RW—read-write). Read-write mediums may be referred to as active mediums, while read-only mediums may represent previously taken snapshots. Within graph 200, a medium points to its underlying medium. For example, medium 20 points to medium 12 to depict that medium 12 is the underlying medium of medium 20. Medium 12 also points to medium 10, which in turn points to medium 5, which in turn points to medium 1. Some mediums are the underlying medium for more than one higher-level medium. For example, three separate mediums (12, 17, 11) point to medium 10, two separate mediums (18, 10) point to medium 5, and two separate mediums (6, 5) point to medium 1. Each of the mediums which is an underlying medium to at least one higher-level medium has a status of read-only.

The set of mediums on the bottom left of graph 200 is an example of a linear set. As depicted in graph 200, medium 3 was created first and then a snapshot was taken resulting in medium 3 becoming stable (i.e., the result of a lookup for a given block in medium 3 will always return the same value after this point). Medium 7 was created with medium 3 as its underlying medium. Any blocks written after medium 3 became stable were labeled as being in medium 7. Lookups to medium 7 return the value from medium 7 if one is found, but will look in medium 3 if a block is not found in medium 7. At a later time, a snapshot of medium 7 is taken, medium 7 becomes stable, and medium 14 is created. Lookups for blocks in medium 14 would check medium 7 and then medium 3 to find the targeted logical block. Eventually, a snapshot of medium 14 is taken and medium 14 becomes stable while medium 15 is created. At this point in graph 200, medium 14 is stable with writes to volume 102 going to medium 15.

Volume to medium mapping table 205 maps user-visible volumes to mediums. Each volume may be mapped to a single medium, also known as the anchor medium. This anchor medium, as with all other mediums, may take care of its own lookups. A medium on which multiple volumes depend (such as medium 10) tracks its own blocks independently of the volumes which depend on it. Each medium may also be broken up into ranges of blocks, and each range may be treated separately in medium DAG 200.

Referring now to FIG. 3, one embodiment of a medium mapping table 300 is shown. Any portion of or the entirety of medium mapping table 300 may be stored in storage controller 110 and/or in one or more of storage devices 135A-N. A volume identifier (ID) may be used to access volume to medium mapping table 205 to determine a medium ID corresponding to the volume ID. This medium ID may then be used to access medium mapping table 300. It is noted that table 300 is merely one example of a medium mapping table, and that in other embodiments, other medium mapping tables, with other numbers of entries, may be utilized. In addition, in other embodiments, a medium mapping table may include other attributes and be organized in a different manner than that shown in FIG. 3. It is also noted that any suitable data structure may be used to store the mapping table information in order to provide for efficient searches (e.g., b-trees, binary trees, hash tables, etc.). All such data structures are contemplated.

Each medium may be identified by a medium ID, as shown in the leftmost column of table 300. A range attribute may also be included in each entry of table 300, and the range may be in terms of data blocks. The size of a block of data (e.g., 4 KB, 8 KB) may vary depending on the embodiment. A medium may be broken up into multiple ranges, and each range of a medium may be treated as if it is an independent medium with its own attributes and mappings. For example, medium ID 2 has two separate ranges. Range 0-99 of medium ID 2 has a separate entry in table 300 from the entry for range 100-999 of medium ID 2.

Although both of these ranges of medium ID 2 map to underlying medium ID 1, it is possible for separate ranges of the same source medium to map to different underlying mediums. For example, separate ranges from medium ID 35 map to separate underlying mediums. For example, range 0-299 of medium ID 35 maps to underlying medium ID 18 with an offset of 400. This indicates that blocks 0-299 of medium ID 35 map to blocks 400-699 of medium ID 18. Additionally, range 300-499 of medium ID 35 maps to underlying medium ID 33 with an offset of −300 and range 500-899 of medium ID 35 maps to underlying medium ID 5 with an offset of −400. These entries indicate that blocks 300-499 of medium ID 35 map to blocks 0-199 of medium ID 33, while blocks 500-899 of medium ID 35 map to blocks 100-499 of medium ID 5. It is noted that in other embodiments, mediums may be broken up into more than three ranges.

The state column of table 300 records information that allows lookups for blocks to be performed more efficiently. A state of "Q" indicates the medium is quiescent, "R" indicates the medium is registered, and "U" indicates the medium is unmasked. In the quiescent state, a lookup is performed on exactly one or two mediums specified in table 300. In the registered state, a lookup is performed recursively. The unmasked state determines whether a lookup should be performed in the basis medium, or whether the lookup should only be performed in the underlying medium. Although not shown in table 300 for any of the entries, another state "X" may be used to specify that the source medium is unmapped. The unmapped state indicates that the source medium contains no reachable data and can be discarded. This unmapped state may apply to a range of a source medium. If an entire medium is unmapped, then the medium ID may be entered into a sequence invalidation table and eventually discarded.

In one embodiment, when a medium is created, the medium is in the registered state if it has an underlying medium, or the medium is in the quiescent state if it is a brand-new volume with no pre-existing state. As the medium is written to, parts of it can become unmasked, with mappings existing both in the medium itself and the underlying medium. This may be done by splitting a single range into multiple range entries, some of which retain the original masked status, and others of which are marked as unmasked.

In addition, each entry in table 300 may include a basis attribute, which indicates the basis of the medium, which in this case points to the source medium itself. Each entry may also include an offset field, which specifies the offset that should be applied to the block address when mapping the source medium to an underlying medium. This allows mediums to map to other locations within an underlying medium rather than only being built on top of an underlying medium from the beginning block of the underlying medium. As shown in table 300, medium 8 has an offset of 500, which indicates that block 0 of medium 8 will map to block 500 of its underlying medium (medium 1). Therefore, a lookup of medium 1 via medium 8 will add an offset of 500 to the original block number of the request. The offset column allows a medium to be composed of multiple mediums. For example, in one embodiment, a medium may be composed of a "gold master" operating system image and per-VM (virtual machine) scratch space. Other flexible mappings are also possible and contemplated.

Each entry also includes an underlying medium attribute, which indicates the underlying medium of the source medium. If the underlying medium points to the source medium (as with medium 1), then this indicates that the source medium does not have an underlying medium, and all lookups will only be performed in the source medium. Each entry may also include a stable attribute, with "Y" (yes) indicating the medium is stable (or read-only), and with "N" (no) indicating the medium is read-write. In a stable medium, the data corresponding to a given block in the medium never changes, though the mapping that produces this data may change. For example, medium 2 is stable, but block 50 in medium 2 might be recorded in medium 2 or in medium 1, which may be searched logically in that order, though the searches may be done in parallel if desired. In one embodiment, a medium will be stable if the medium is used as an underlying medium by any medium other than itself.

Figure 4:
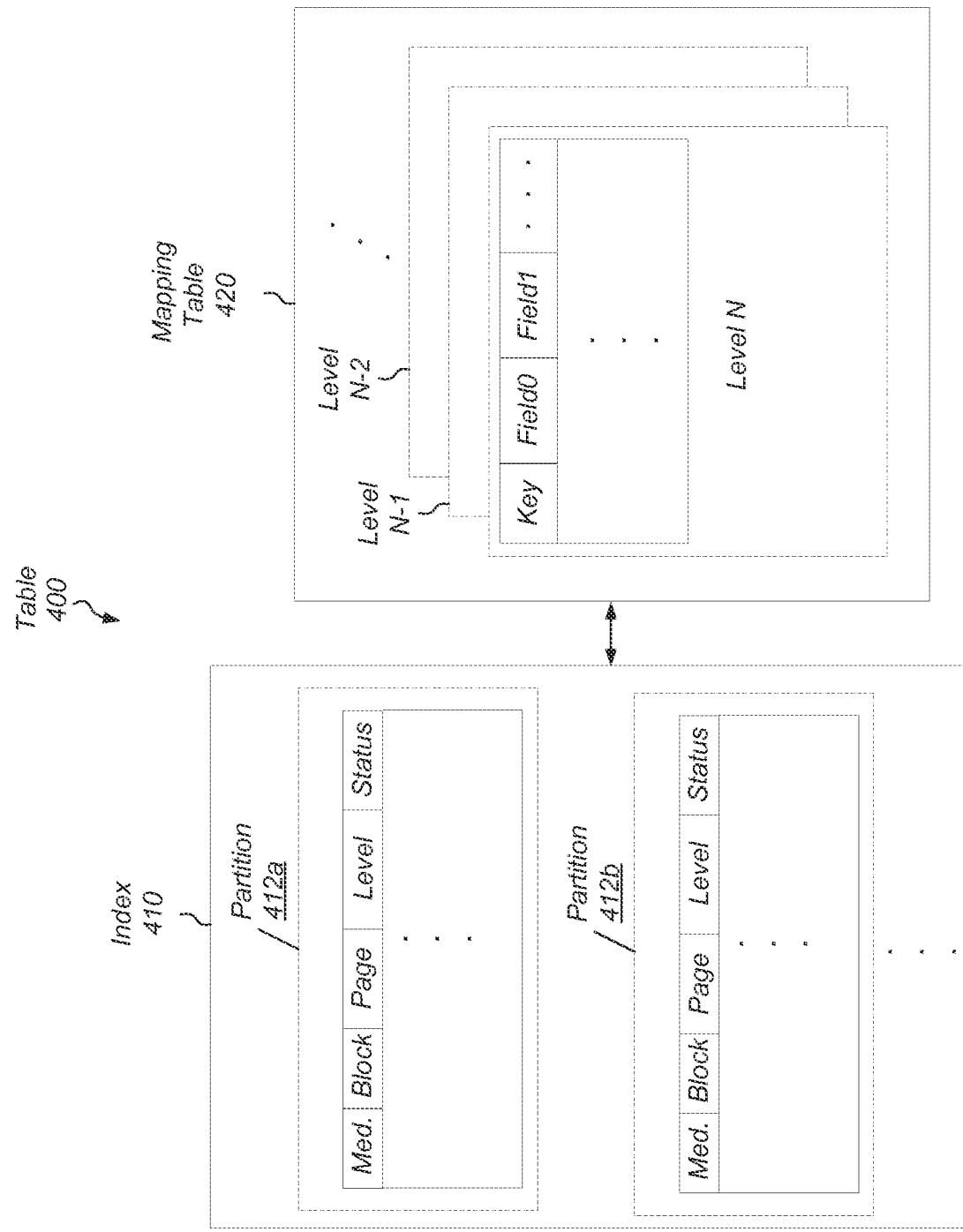
FIG. 4 illustrates one embodiment of a table utilized by a storage controller.

Turning now to FIG. 4, a block diagram of one embodiment of a table 400 is shown. In various embodiments, table 400 may be an address translation table, a deduplication table, an overlay table, or any other type of table utilized by a storage controller. In an embodiment with table 400 utilized as an address translation table, a given received read/write request received by a storage controller may identify a particular volume, sector (or block number), and length. The volume may be translated into a medium ID using the volume-to-medium mapping table. The medium ID and block number may then be used to access index 410 to locate an index entry corresponding to the specific medium ID and block number. The index entry may store at least one tuple including a key. Each index entry may also include a level ID and page ID of a corresponding entry in mapping table 420.

Using the level ID, page ID, and a key value generated from the medium ID and block number, the corresponding mapping table entry may be located and a pointer to the storage location may be returned from this entry. The pointer may be used to identify or locate data stored in the storage devices of the storage system. In addition to the pointer value, status information, such as a valid indicator, a data age, a data size, and so forth, may be stored in Field0 to FieldN shown in Level N of mapping table 420. It is noted that in various embodiments, the storage system may include storage devices (e.g., SSDs) which have internal mapping mechanisms. In such embodiments, the pointer in the mapping table entry may not be an actual physical address per se. Rather, the pointer may be a logical address which the storage device maps to a physical location within the device.

For the purposes of this discussion, the key value used to access entries in index 410 is the medium ID and block number corresponding to the data request. However, in other embodiments, other types of key values may be utilized. In these embodiments, a key generator may generate a key from the medium ID, block number, and/or one or more other requester data inputs, and the key may be used to access index 410 and locate a corresponding entry.

In one embodiment, index 410 may be divided into partitions, such as partitions 412*a*-412*b*. In one embodiment, the size of the partitions may range from a 4 kilobyte (KB) page to 256 KB, though other sizes are possible and are contemplated. Each entry of index 410 may store a key value, and the key value may be based on the medium ID, block number, and other values. For the purposes of this discussion, the key value in each entry is represented by the medium ID and block number. This is shown merely to aid in the discussion of mapping between mediums and entries in index 410. In other embodiments, the key values of entries in index 410 may vary in how they are generated.

In various embodiments, portions of index 410 may be cached, or otherwise stored in a relatively fast access memory. In various embodiments, the entire index 410 may be cached. In some embodiments, where the primary index has become too large to cache in its entirety, or is otherwise larger than desired, secondary, tertiary, or other index portions may be used in the cache to reduce its size. In addition to the above, in various embodiments mapping pages corresponding to recent hits may be cached for at least some period of time. In this manner, processes which exhibit accesses with temporal locality can be serviced more rapidly (i.e., recently accessed locations will have their mappings cached and readily available).

In some embodiments, index 410 may be a secondary index which may be used to find a key value for accessing a primary index. The primary index may then be used for locating corresponding entries in address translation table 400. It is to be understood that any number of levels of indexes may be utilized in various embodiments. In addition, any number of levels of redirection may be utilized for performing the address translation of received data requests, depending on the embodiment. In some embodiments, a corresponding index may be included in each level of mapping table 420 for mappings which are part of the level. Such an index may include an identification of mapping table entries and where they are stored (e.g., an identification of the page) within the level. In other embodiments, the index associated with mapping table entries may be a distinct entity, or entities, which are not logically part of the levels themselves. It is noted that in other embodiments, other types of indexes and mapping tables may be utilized to map medium IDs and block numbers to physical storage locations.

Mapping table 420 may comprise one or more levels. For example, in various embodiments, table 420 may comprise 16 to 64 levels, although other numbers of levels supported within a mapping table are possible and contemplated. Three levels labeled Level "N", Level "N−1" and Level "N−2" are shown for ease of illustration. Each level within table 420 may include one or more partitions. In one embodiment, each partition is a 4 kilo-byte (KB) page. In one embodiment, a corresponding index 410 may be included in each level of mapping table 420. In this embodiment, each level and each corresponding index 410 may be physically stored in a random-access manner within the storage devices.

In another embodiment, table 400 may be a deduplication table. A deduplication table may utilize a key comprising a hash value determined from a data component associated with a storage access request. The initial steps of a deduplication operation may be performed concurrently with other operations, such as a read/write request, a garbage collection operation, a trim operation, and so forth. For a given write request, the data sent from one of the client computer systems may be a data stream, such as a byte stream. As is well known to those skilled in the art, a data stream may be divided into a sequence of fixed-length or variable-length chunks. A chunking algorithm may perform the dividing of the data stream into discrete data components which may be referred to as "chunks". A chunk may be a sub-file content-addressable unit of data. In various embodiments, a table or other structure may be used to determine a particular chunking algorithm to use for a given file type or type of data. A file's type may be determined by referring to its file name extension, separate identifying information, the content of the data itself, or otherwise. The resulting chunks may then be stored in one of the storage devices to allow for sharing of the chunks. Such chunks may be stored separately or grouped together in various ways.

In various embodiments, the chunks may be represented by a data structure that allows reconstruction of a larger data component from its chunks (e.g., a particular file may be reconstructed based on one or more smaller chunks of stored data). A corresponding data structure may record its corresponding chunks including an associated calculated hash value, a pointer (physical and/or logical) to its location in one of the storage devices, and its length. For each data component, a deduplication application may be used to calculate a corresponding hash value. For example, a hash function, such as Message-Digest algorithm 5 (MD5), Secure Hash Algorithm (SHA), or otherwise, may be used to calculate a corresponding hash value. In order to know if a given data component corresponding to a received write request is already stored in one of the storage devices, bits of the calculated hash value (or a subset of bits of the hash value) for the given data component may be compared to bits in the hash values of data components stored in one or more of the storage devices.

In a further embodiment, table 400 may be an overlay table. One or more overlay tables may be used to modify or elide tuples corresponding to key values in the underlying mapping table and provided by other tables in response to a query. The overlay table(s) may be used to apply filtering conditions for use in responding to accesses to the mapping table or during flattening operations when a new level is created. Keys for the overlay table need not match the keys for the underlying mapping table. For example, an overlay table may contain a single entry stating that a particular range of data has been deleted or is otherwise inaccessible and that a response to a query corresponding to a tuple that refers to that range is invalid. In another example, an entry in the overlay table may indicate that a storage location has been freed, and that any tuple that refers to that storage location is invalid, thus invalidating the result of the lookup rather than the key used by the mapping table. In some embodiments, the overlay table may modify fields in responses to queries to the underlying mapping table. In some embodiments, a range of key values may be used to efficiently identify multiple values to which the same operation is applied. In this manner, tuples may effectively be "deleted" from the mapping table by creating an "elide" entry in the overlay table and without modifying the mapping table. The overlay table may be used to identify tuples that may be dropped from the mapping table in a relatively efficient manner.

Figure 5:
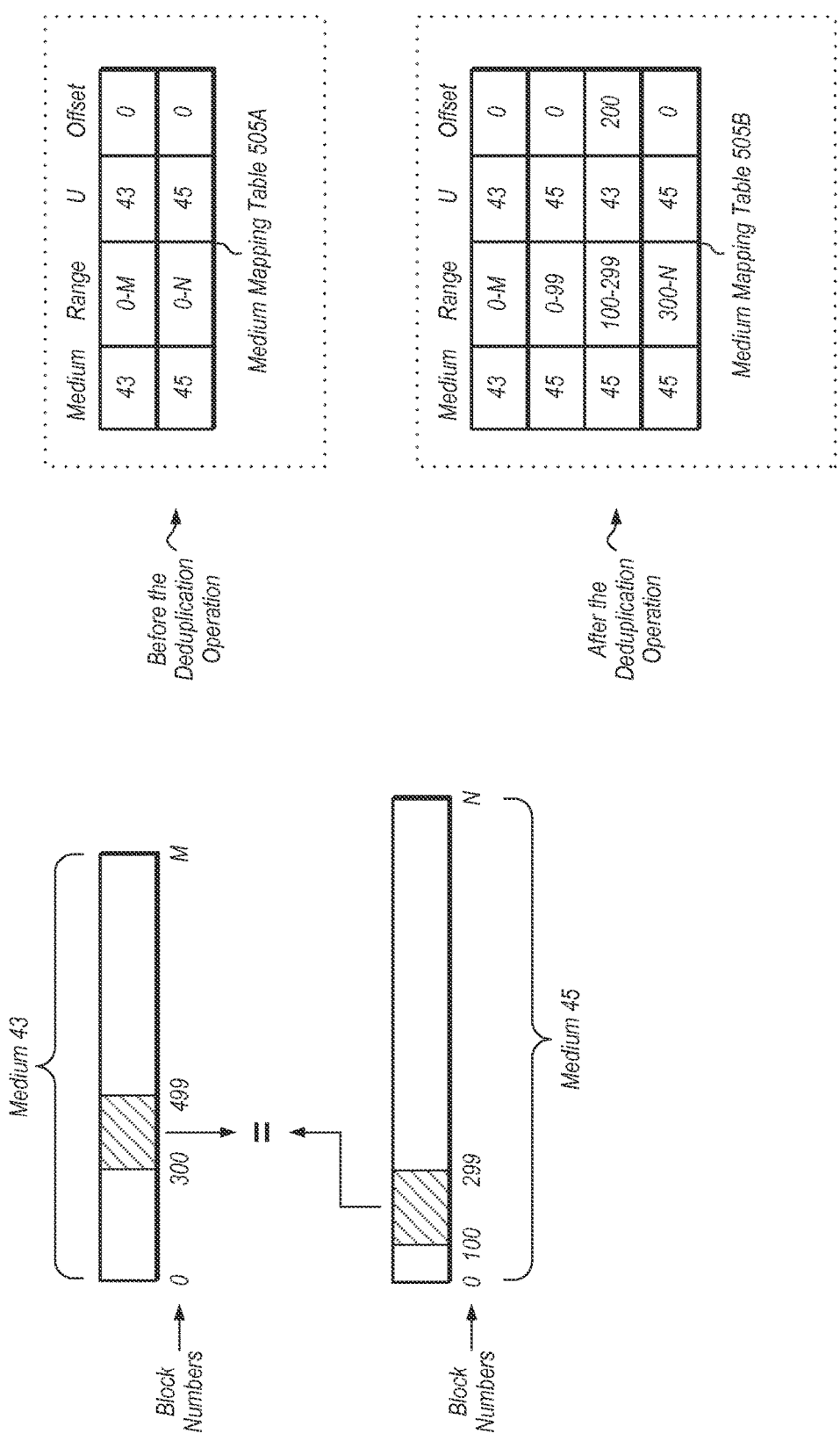
FIG. 5 is a generalized block diagram of one embodiment of a coarse-grained deduplication operation.

Turning now to FIG. 5, a block diagram of one embodiment of a coarse-grained deduplication operation is shown. In one embodiment, a storage controller may search for regions of identical data that are stored in multiple mediums. When the storage controller locates regions of identical data stored in multiple mediums, the storage controller may perform a coarse-grained deduplication operation. Medium mapping table 505A represents a portion of the overall medium mapping table prior to the coarse-grained deduplication operation being performed. Table 505A includes entries for mediums 43 and 45, both of which have a single entry for the entire medium, record themselves as their underlying medium, and have a status of read-only (i.e., stable).

It may be assumed for the purposes of this discussion that the storage controller has detected that the data in the first range (blocks 300-499) of medium 43 is identical to the data in the second range (blocks 100-299) of medium 45. The storage controller may detect identical data in large regions using any of a variety of techniques, depending on the embodiment. In one embodiment, the storage controller may perform a byte-by-byte comparison of regions to detect identical data. In some cases, a byte-by-byte comparison may not involve actually reading the data if the regions include pattern blocks or unmapped (zero) blocks. In another embodiment, the storage controller may perform a hash-by-hash comparison of regions to detect identical data. In a further embodiment, the storage controller may verify that the mappings of separate medium regions point to identical blocks. For example, the storage controller may detect that block 300 of medium 43 points to the same physical location as block 100 of medium 45. Therefore, the storage controller may determine that these blocks refer to the same data. In one embodiment, the storage controller may use a combination of all three of these techniques for detecting identical data in large volume regions. If any one of the three conditions (based on any of these three techniques) holds true for all blocks in two separate regions, then the storage controller may conclude that the regions are the same.

As a result of detecting the identical data stored in both mediums, the storage controller may initiate a coarse-grained deduplication operation to merge the mappings of the identical regions. It is noted that the data in the first range of medium 43 and second range of medium 45 may have already been deduplicated at a fine-grained level, as part of the normal fine-grained deduplication processing utilized by the storage controller.

In response to detecting the identical data, the first range of medium 43 may be recorded as the underlying medium of the second range of medium 45. This is shown in table 505B, which includes a new entry for the second range of medium 45. An offset of 200 may also be recorded for this entry, and the offset of 200 may be applied when mapping blocks in the second range of medium 45 to medium 43 so that the blocks are properly aligned with the first range of medium 43. There are also two new entries for medium 45 corresponding to the other regions of the address space which are outside of the second range. The attributes from the previous entry for medium 45 in table 505A may be copied to the new entries for the first and third ranges of medium 45 in table 505B. The entries for the first range (0-99) and third range (300-N) of medium 45 may have medium 45 recorded as the underlying medium. Instead of using the existing address translation table entries for future lookups to the second range of the medium 45, lookups may refer to the address translation table entries which are associated with the first range of medium 43.

In addition to changing the entries of the medium mapping table, in some embodiments, an indication may be stored to invalidate the existing address translation table entries that are associated with the second range of medium 45. Later, when garbage collection of mappings is performed, these address translation table entries that are marked as invalid may be discarded.

In one embodiment, after performing the coarse-grained deduplication operation, a future lookup to the second range of medium 45 will result in the storage controller determining the underlying medium of the second range of medium 45 by querying medium mapping table 505B. Then, after identifying the first range of medium 43 as the underlying medium of the second range of medium 45, the storage controller will perform a lookup of address translation table entries assigned to medium 43.

Figure 6:
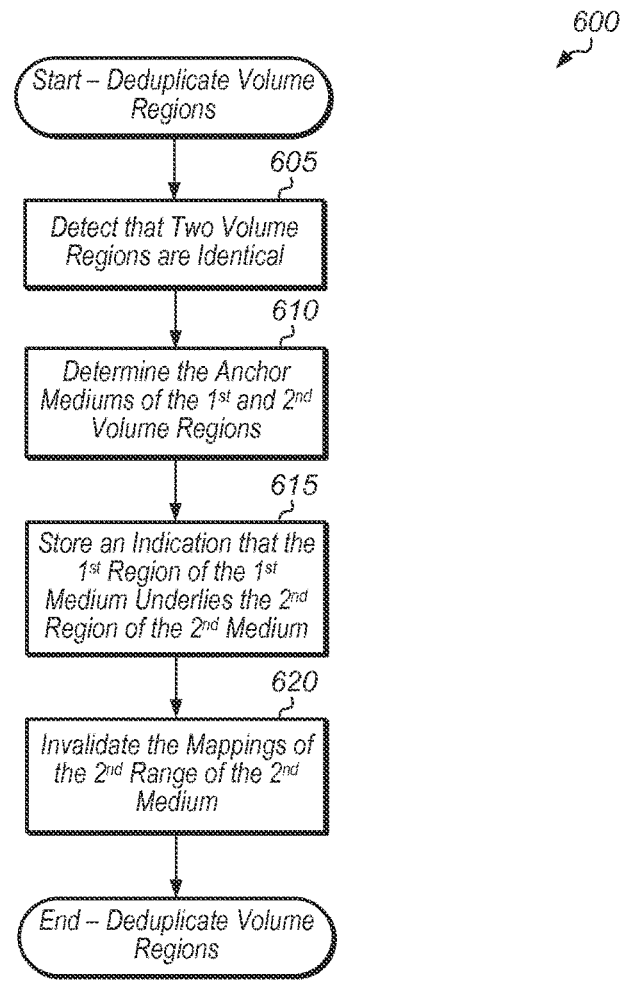
FIG. 6 is a generalized flow diagram illustrating one embodiment of a method for deduplicating volume regions.

Referring now to FIG. 6, one embodiment of a method 600 for deduplicating volume regions is shown. The components embodied in system 100 described above (e.g., storage controller 110) may generally operate in accordance with method 600. In addition, the steps in this embodiment are shown in sequential order. However, some steps may occur in a different order than shown, some steps may be performed concurrently, some steps may be combined with other steps, and some steps may be absent in another embodiment.

The storage controller may detect that two separate volume regions are identical (block 605). These two identical regions may be referred to as the first volume region and the second volume region for the purposes of this discussion. The storage controller may detect these identical regions using any of the previously described techniques. In one embodiment, the first volume region may be in a first volume and the second volume region may be in a second volume. However, in another embodiment, the first volume region and the second volume region may be part of the same volume.

Next, the storage controller may determine the anchor medium regions of the first volume region and the second volume region (block 610). These anchor mediums regions may be referred to as the first region of the first medium and the second region of the second medium, respectively. For example, in one embodiment, the first medium may have multiple separate regions, and the first volume region may point to only a single region of the first medium. It may be assumed for the purposes of this discussion that the first region of the medium and the second region of the second medium are stable. If either the first region of the first medium or the second region of the second medium are active regions, then the storage controller may make them stable prior to determining that they contain identical data.

Next, the storage controller may store an indication that the first range of the first medium underlies the second range of the second medium (block 615). In one embodiment, this may entail creating a new entry in the medium mapping table for the second range of the second medium, and recording that the first range of the first medium underlies the second range of the second medium in this new entry. All other ranges (besides the second range) of the second medium may retain their current medium-to-medium mappings as indicated by the existing entry (or entries) for the second medium in the medium mapping table.

If the first range is located at a first offset within the address space of the first medium, and if the second range is located at a second offset within the address space of the second medium, then a third offset may be stored in this new entry, with the third offset equal to the difference between the first offset and the second offset. It is noted that if the second offset is greater than the first offset, then the third offset will have a negative value. After block 615, the storage controller may invalidate and/or reclaim the address translation (AT) mappings of the second range of the second medium (block 620). The storage controller may discard the address translation mappings immediately or at a later point in time, depending on the embodiment. For example, these address translation mappings may be discarded when a merge operation is performed at a later point in time. A merge operation involves performing garbage collection of address translation mappings which can no longer be reached. The remainder of the address translation mappings for the other ranges of the second medium may be retained. After block 620, method 600 may end.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a data storage subsystem comprising a plurality of data storage locations on a plurality of storage devices; and
a storage controller coupled to the plurality of storage devices, wherein the storage controller is configured to:
maintain a table to track mappings between logical groups of active data in the plurality of storage devices and logical groups of snapshot data in the plurality of storage devices;
determine that snapshot data within a first range of a first logical group of snapshot data is representative of active data within a second range of second logical group of active data;
in response to determining that snapshot data within the first range is representative of active data within the second range, indicate within the table, a mapping of the second range of the second logical group of active data to the first range of the first logical group of snapshot data; and
in response to a request for the active data within the second range of the second logical group, use the table to retrieve the snapshot data from the first range of the first logical group;
wherein the first range of snapshot data is located at a first offset within an address space of the first logical group;
wherein the second range of active data is located at a second offset within an address space of the second logical group, and
store an indication that the second range is aligned to the first range using a third offset.

2. The computer system as recited in claim 1, wherein the storage controller is further configured to:
responsive to indicating with the table, the mapping of the second range to the first range, invalidate a plurality of entries corresponding to the second range in the table.

3. The computer system as recited in claim 1, wherein the first range of the first logical group and the second range of the second logical group are associated with a first volume.

4. The computer system as recited in claim 1, wherein the snapshot data of the first range of the first logical group is read-only.

5. The computer system as recited in claim 1, wherein the third offset is equal to a difference between the second offset and the first offset.

6. The computer system as recited in claim 1, wherein the second range is a portion of an address space of the second logical group, wherein the storage controller is further configured to:
create a new entry in the table for each additional range of the second logical group; and
copy a plurality of attributes from a second entry in the table to each new entry, wherein the second entry is assigned to the second logical group, and wherein the plurality of attributes include a specification of another logical group and an offset.

7. The computer system as recited in claim 1, wherein the mapping is indicated in a first entry in the table, and wherein the first entry is assigned to the second logical group.

8. A method for use in a storage system, the storage system including a plurality of storage devices, the method comprising:
maintaining a table to track mappings between logical groups of active data in the plurality of storage devices and logical groups of snapshot data in the plurality of storage devices;
determining that snapshot data within a first range of a first logical group of snapshot data is representative of active data within a second range of second logical group of active data;
in response to determining that snapshot data within the first range is representative of active data within the second range, indicating within the table, a mapping of the second range of the second logical group of active data to the first range of the first logical group of snapshot data; and in response to a request for the active data within the second range of the second logical group, using the table to retrieve the snapshot data from the first range of the first logical group, wherein the first range of snapshot data is located at a first offset within an address space of the first logical group;

wherein the second range of active data is located at a second offset within an address space of the second logical group, and storing an indication that the second range is aligned to the first range using a third offset.

9. The method as recited in claim 8, further comprising:
responsive to indicating with the table, the mapping of the second range to the first range, invalidating a plurality of entries corresponding to the second range of the second medium in the table.

10. The method as recited in claim 8, wherein the first range of the first logical group and the second range of the second logical group are associated with a first volume.

11. The method as recited in claim 8, wherein the snapshot data of the first range of the first logical group is read-only.

12. The method as recited in claim 8, wherein the third offset is equal to a difference between the second offset and the first offset.

13. The method as recited in claim 8, wherein the second range is a portion of an address space of the second logical group, wherein the method further comprising:
creating a new entry in the table for each additional range of the second logical group; and
copying a plurality of attributes from a second entry in the table to each new entry, wherein the second entry is assigned to the second logical group, and
wherein the plurality of attributes include a specification of another logical group and an offset.

14. The method as recited in claim 8, wherein the mapping is indicated in a first entry in the table, and wherein the first entry is assigned to the second logical group.

15. A non-transitory computer readable storage medium storing program instructions, wherein the program instructions are executable by a processor to:
maintain a table to track mappings between logical groups of active data in a plurality of storage devices and logical groups of snapshot data in the plurality of storage devices;

determine that snapshot data within a first range of a first logical group of snapshot data is representative of active data within a second range of second logical group of active data;

in response to determining that snapshot data within the first range is representative of active data within the second range, indicate within the table, a mapping of the second range of the second logical group of active data to the first range of the first logical group of snapshot data; and in response to a request for the active data within the second range of the second logical group, use the table to retrieve the snapshot data from the first range of the first logical group;

wherein the first range of snapshot data is located at a first offset within an address space of the first logical group;

wherein the second range of active data is located at a second offset within an address space of the second logical group, and store an indication that the second range is aligned to the first range using a third offset.

16. The computer readable storage medium as recited in claim 15, wherein the program instructions are further executable by a processor to:
responsive to indicating with the table, the mapping of the second range to the first range, invalidate a plurality of entries corresponding to the second range in the table.

17. The computer readable storage medium as recited in claim 15, wherein the first range of the first logical group and the second range of the second logical group are associated with a first volume.

18. The computer readable storage medium as recited in claim 15, wherein the first logical group includes a plurality of ranges of snapshot data; and the second logical group includes a plurality of ranges of active data.

19. The computer readable storage medium as recited in claim 15, wherein the third offset is equal to a difference between the second offset and the first offset.

20. The computer readable storage medium as recited in claim 15, wherein the second range is a portion of an address space of the second logical group, and wherein the program instructions are further executable by a processor to:
create a new entry in the table for each additional range of the second logical group; and
copy a plurality of attributes from a second entry in the table to each new entry, wherein the second entry is assigned to the second logical group, and wherein the plurality of attributes include a specification of another logical group and an offset.

* * * * *